Jan. 22, 1952     W. J. SLODERBECK ET AL     2,583,309
CUTTING TOOL
Filed May 27, 1946
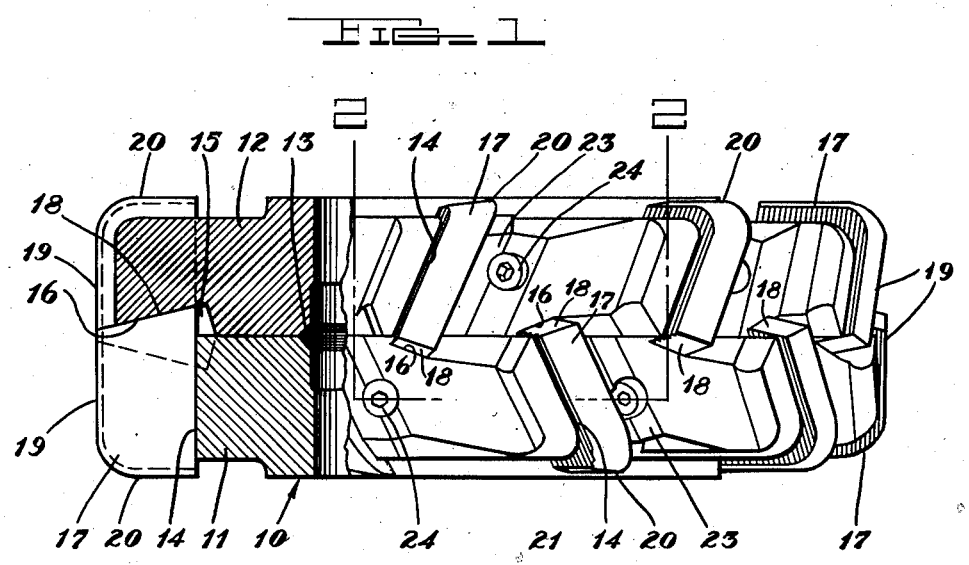
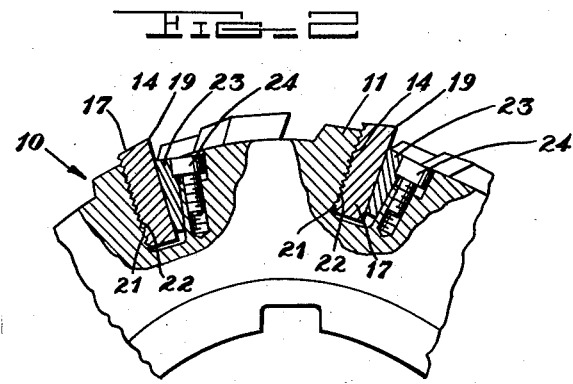
Inventor
WILLIAM J. SLODERBECK
WILLIAM H. FRITZ SR.
Attorneys Patented Jan. 22, 1952

2,583,309

UNITED STATES PATENT OFFICE 2,583,309

CUTTING TOOL

William J. Sloderbeck and William H. Fritz, Sr., Southfield Township, Oakland County, Mich., assignors to Goddard and Goddard Company, Detroit, Mich., a corporation of Michigan Application May 27, 1946, Serial No. 672,614

3 Claims. (Cl. 29—105)

This invention relates generally to cutting tools and refers more particularly to improvements in the construction of inserted blade type cutters.

In the manufacture of certain inserted blade cutters, it has been the practice to form the body of the cutter of one piece construction and to mill or otherwise form two series of circumferentially spaced blade receiving slots in the periphery thereof with the slots in one series staggered with respect to the slots in the other series. Also, the slots in one series are arranged to open through one face of the cutter and the slots in the other series open through the opposite face of the cutter. The construction is such that the blades in the two series of slots extend beyond the periphery of the body and respectively project beyond opposite sides of the body to enable fashioning channels with the cutter assembly.

One of the disadvantages of the above type of cutter or cutter construction is the high cost of manufacture. For example, the milling of slots in the body of the cutter for the blades is very expensive due to the fact that the slots are open at the outer ends only and are closed at their inner ends.

The above characteristic or manufacturing requirement results in producing a second serious disadvantage of the type of cutter previously mentioned. Owing to the fact that the inner ends of the slots are closed, the slots must be longer than required in order to provide ample clearance space for the milling cutter and this space must either be filled by shaping the inner ends of the blades and locking wedge elements or must be left open. Shaping the inner ends of the blades and wedge elements to fill the spaces adds materially to the cost of the cutter, and if the spaces are left open they form pockets which collect chips and foreign matter during performance of the cutter which seriously interfere with efficient operation of the cutter.

A third objectionable feature of the above general type of cutter is its inability to positively hold the cutter blades from slipping or moving in a direction parallel to the slots under the pressure resulting from the cutting operation.

The principal object of this invention is to overcome the above objections, and this is accomplished by forming the cutter body of two sections. More particularly, the present invention provides a cutter body divided perpendicular to its axis into two sections integrally connected by welding or by otherwise securing the sections together.

The above feature greatly reduces the cost of manufacture of the cutter, because it enables milling the blade slots through the peripheral portions of the sections prior to securing the same together. In other words, the necessity of milling blind slots is avoided and, as a consequence, the milling operation is greatly simplified.

Also, by virtue of the fact that the body sections are formed separately, it is possible to provide for abutting the inner ends of the cutter blades and locking wedges squarely against the inner faces of the body sections so as to eliminate the chip pockets.

The metal to metal contact between the inner ends of the blades and inner faces of the cutter body sections accomplishes the further function of preventing endwise movement of the cutter blades under stresses resulting from cutting pressures.

Still another object of this invention is to taper the inner edges of the blades axially outwardly from the radially inner edges of the blades to the radially outer edges thereof and to correspondingly taper the inner surfaces of the body sections engaged by the inner edges of the blades. Thus, adjustment of the blades radially outwardly preparatory to grinding the outside diameter of the cutter automatically shifts the blades axially outwardly to provide grinding stock at the sides of the cutter for maintenance of a predetermined width of cut. As a result, initial grinding of the cutter to specified diameters and widths is not only simplified but, in addition, maintenance of the cutter is greatly facilitated and reduced in cost.

The foregoing as well as other objects will be made more apparent as this description proceeds, especially when considered in connection with the accompanying drawing, wherein:

Figure 1 is an elevational view of an inserted tooth cutter having certain parts broken away for the sake of clearness and embodying the features of this invention; and Figure 2 is a fragmentary sectional view taken substantially on the plane indicated by the line 2—2 of Figure 1.

The invention is specifically illustrated herein in connection with rotary inserted blade type cutters having provision for cutting at both sides and at the periphery thereof. This type of rotary cutter is particularly useful for fashioning channel-shaped cuts in workpieces, although it will be understood as this description proceeds, that many of the features of this invention are applicable to different types of inserted blade cutters.

The rotary inserted blade type cutter shown in the drawing comprises an annular body 10 composed of two ring-like sections 11 and 12 welded or otherwise permanently secured together with the inner faces of the sections in bearing engagement. In the present instance, the two body sections are secured together by a ring-type weld, although it will be understood that other methods of securing may be employed. For example, the two body sections may be spot welded at circumferentially spaced points around the periphery thereof, or the sections may be bolted or pinned together.

In any case the peripheral portion of each section of the body is formed with slots 14 spaced equal distances from each other circumferentially of the section and extending from the outer side of the section to the inner side of the latter. The inner sides of both body sections are also formed with recesses 15 spaced from each other in a manner to permit the recesses in one section to register with the rear ends of the slots 14 in the other section when the two sections are in assembled relationship. Thus, the inner ends of the two series of slots in the respective body sections are closed by the walls 16 of the recesses 15, and for the purpose of this description, the walls 16 may be considered portions of the inner sides of the two body sections.

A cutting blade 17 is positioned in each slot 14 and the inner ends of the blades in the slots 14 in one section project into the registering recesses 15 formed in the inner side of the other section. As shown particularly in Figure 1 of the drawing, the inner ends 18 of the blades abut the walls 16 of the registering recesses 15 to avoid the formation of clearance spaces at the inner ends of the blades in which chips and other foreign matter may accumulate. The radially outer edges 19 of the blades 17 project beyond the periphery of the body 10 to provide cutting edges and the axially outer edges 20 of the two sets of blades on the respective sections project beyond the outer side of the body to provide side cutting edges on the blades.

In accordance with conventional practice, serrations 21 are formed in one side of each blade 17 and extend from the axially outer edge of the blade to the axially inner edge of the latter. These serrations are adapted to mesh with the corresponding serrations 22 formed in the adjacent sides of the slots 14. In the present instance, the serrations 21 on the blades are held in meshing relationship with the serrations 22 by tapered clamping members 23 respectively positioned in the slots 14 and secured in place by set screws 24. The axially inner ends of the clamping members 23 associated with one body section abut the inner side of the other body section, so as to avoid the formation of clearance spaces within which chips or other foreign matter may accumulate. By engaging the axially inner ends of the blades 17 and clamping members 23 with the inner sides of the body sections, chip pockets are not only omitted, but the blades are held in their respective pockets against movement regardless of the terrific cutting pressures applied thereto during operation.

Referring again to Figure 1 of the drawing, it will be noted that the walls 18 of the recesses 15 are tapered from the bottom portions of the recesses toward the adjacent ends of the slots registering with the recesses and the inner ends of the blades 17 are correspondingly tapered. As a result the blades 17 are shifted axially outwardly in response to movement of the blades radially outwardly in their respective slots 14. This arrangement is highly advantageous in that it not only simplifies initial grinding of the cutter to a preselected diameter and width but, in addition, greatly reduces maintenance cost. In other words, adjustment of the blades for outside diameter grinding automatically provides grinding stock on the outer ends of the blades to enable maintaining the width of the cut to a specified dimension.

In manufacture the slots 14 and the recesses 15 are milled or otherwise formed in the peripheral portions of the body sections before the latter are assembled or secured together. After the slots 14 and recesses 15 have been properly formed in the respective body sections, the latter are positioned so that the recesses 15 in one section register with the slots 14 in the other section, and the two sections are welded together while held in the above relative position.

What we claim as our invention is:

1. A rotary inserted blade type cutter having an annular body comprising two ring-like sections permanently secured together with the adjacent surfaces in bearing engagement, the peripheral portion of one section having circumferentially spaced blade receiving slots extending from the front side of said one section to the inner side of the latter and having the inner ends of the slots closed by the adjacent inner side of the other section, blades positioned in the slots with the inner ends abutting the inner side of the said other section, the inner ends of the blades being tapered axially outwardly from the radially inner edges of the blades to the radially outer edges of the blades and the portions of the said other section which abut the inner ends of the blades being correspondingly tapered whereby the blades are shifted axially outwardly in response to movement of the blades radially outwardly, and means for removably clamping the blades in the slots.

2. A rotary inserted blade type cutter having an annular body comprising two ring-like sections permanently secured together with the adjacent surfaces in bearing engagement, the peripheral portion of each section having blade receiving slots extending from the outer sides of the sections to the inner sides of the latter and the slots in one section being staggered with respect to the slots in the other section whereby the inner ends of the slots are closed by the inner surfaces of the sections, blades positioned in the slots with the inner ends abutting the inner surfaces of the sections, the inner ends of the blades being tapered axially outwardly from the radially inner edges of the blades and the portions of inner surfaces of the sections which engage the inner ends of the blades being correspondingly tapered whereby the blades are shifted axially outwardly in response to movement of the blades radially outwardly, and clamping members for the blades also positioned in the slots and having the inner ends abutting the adjacent inner sides of said sections.

3. A rotary inserted blade type cutter comprising a body formed of two annular sections secured together with flat side surfaces in engagement, each of said sections having blade-receiving slots of uniform axial cross-section extending completely through the section from side to side and opening at the periphery, the inner side surface of each section having recesses therein in registry with the slots in the other sections said recesses having inclined inner walls forming the ends of blade receiving pockets partly defined by the side walls of the slots which are inclined outwardly of the body from a radial plane to provide for axially outward displacement of blades in the pockets upon radially outward adjustment of the blade with their inner ends in contact with the inner walls of the recesses.

WILLIAM J. SLODERBECK.
WILLIAM H. FRITZ, Sr.

REFERENCES CITED

The following references are of record in the file of this patent:

UNITED STATES PATENTS

| Number | Name | Date |
|---|---|---|
| 684,151 | West | Oct. 8, 1901 |
| 1,332,736 | McQuestion | Mar. 2, 1920 |
| 1,714,700 | Stull | May 28, 1929 |
| 1,874,536 | Irwin | Aug. 30, 1932 |
| 2,188,743 | Severson | Jan. 20, 1940 |
| 2,309,409 | Miller | Jan. 26, 1943 |
| 2,338,990 | Wenzel | Jan. 11, 1944 |
| 2,377,773 | Francis | June 5, 1945 |
| 2,395,288 | Miller | Feb. 19, 1946 |

FOREIGN PATENTS

| Number | Country | Date |
|---|---|---|
| 562,897 | Great Britain | July 20, 1944 |